United States Patent [19]

Sakamoto et al.

[11] 4,171,617

[45] Oct. 23, 1979

[54] SOLAR THERMAL ELECTRIC SYSTEMS

[75] Inventors: Takeshi Sakamoto, Oaza Tokai; Shunichi Anzai; Nariyoshi Kobayashi, both of Hitachi, all of Japan

[73] Assignee: Agency of Industrial Science & Technology, Tokyo, Japan

[21] Appl. No.: 849,344

[22] Filed: Nov. 7, 1977

[30] Foreign Application Priority Data

Nov. 9, 1976 [JP] Japan ................. 51/133816

[51] Int. Cl.² .................. F03G 7/02; F01K 3/00
[52] U.S. Cl. ................................. 60/641; 60/659
[58] Field of Search ............... 60/641, 659, 660, 664, 60/666, 652

[56] References Cited

U.S. PATENT DOCUMENTS

| | | | |
|---|---|---|---|
| 2,933,885 | 4/1960 | Benedek | 60/659 |
| 3,848,416 | 11/1974 | Bundy | 60/659 X |
| 3,977,197 | 8/1976 | Brantley | 60/659 |

*Primary Examiner*—Allen M. Ostrager
*Attorney, Agent, or Firm*—Birch, Stewart, Kolasch & Birch

[57] ABSTRACT

A solar thermal electric power system, in which a solar collector, a heat storage vessel filled with a thermal storage material adapted to effect a phase change between solid and liquid internally, a turbine, a condenser, a condensate storage tank, a feed water pump are connected in a closed loop by suitable conduits. A first control valve is provided en route between the solar collector and a heat storage vessel. An steam accumulator filled with water is connected via a second control valve in a pipe route between the solar collector and the first control valve, as well as to a pipe route between the first control valve and the heat storage vessel via a third control valve. The temperature of a fluid flowing out of the solar collector is detected, and when the temperature detected is to be lower than a set temperature, then the first control valve is controlled so as to be closed, while the second control valve is opened.

8 Claims, 3 Drawing Figures

SOLAR THERMAL ELECTRIC SYSTEMS

BACKGROUND OF THE INVENTION

This invention relates to a solar thermal electric power system. The solar thermal electric system is provided with a heat storage device because of intermittent supply of solar energy from the sun. Various kinds of heat storage devices are known, and there have been proposed many solar thermal electric power systems, some of which will be described hereinafter.

A first example of a prior art solar thermal electric system is disclosed in the Japanese Laid-open Patent Application No. Sho 50-154852, in which a solar collector system is connected via a heat storage vessel to a power generating system. The solar collector system has a first passage including a solar collector, a heat storage device and a pump to provide a closed circulation loop. The power generating system has a second passage including a heat storage vessel, a turbine, a condenser, and a pump to provide a another closed circulation loop. The generator is connected to the turbine. A thermal medium in the first passage is heated by solar energy which has been collected by the solar collector, pressurized by the pump, and then fed to the heat storage vessel. The heat storage vessel is filled with a thermal storage material. The heat of thermal medium flowing through the first passage is conducted to the thermal storage material in the heat storage vessel. Then, the temperature of the thermal medium is lowered and the thermal medium is delivered back to the solar collector. Water is circulated through the second passage by means of a pump provided in the second passage. Water flowing through the second passage is heated and vaporized into steam while passing through the heat storage vessel. The steam thus produced is delivered to the turbine for driving the same. Steam is condensed into the form of water, and then delivered to the heat storage vessel.

However, this prior art system suffers from the following disadvantages. In order for the heat of thermal medium flowing through the first passage to be transferred to the thermal storage material, a temperature difference or thermal head should be at least 50° C. to 100° C. On the other hand, when steam is to be produced from the thermal storage material for driving a turbine, a temperature difference as above is required. A temperature difference of at least 200° C. is required between the steam from the solar collector, and the steam at the entrance of a turbine. In this regard, the efficiency of a turbine plant is increased, as the temperature of steam at the entrance of a turbine is increased, so that a decrease in temperature of steam at the entrance of a turbine due to the use of the heat storage vessel leads to a decrease in efficiency of a turbine plant and associated heat generating plant.

In addition, the above-described prior art system adopts a counterflow type in an attempt to increase a temperature efficiency of heat exchange between the thermal medium and a turbine drive medium (a fluid for driving a turbine, for instance, steam). However, since an outlet for a turbine driving medium and an inlet for the thermal medium are positioned close to each other, a temperature change in the thermal medium directly affects the temperature of a turbine driving medium, thereby causing a thermal shock on a turbine. Furthermore, when there is a temperature drop of steam at an outlet of the solar collector due to a sharp drop in amount of solar radiation, then the heat in a high temperature portion of a heat storage vessel in the vicinity of an outlet for steam, of the heat storage vessel is shifted to a low temperature portion of the heat storage vessel, thus failing to obtain high temperature steam for use in driving a turbine.

A second prior art system is disclosed in Pages 184 to 190, particularly in FIG. 13, 2-3, Colorado State University et al: "Solar Thermal Electric Power System" ANNUAL PROGRESS REPORT (National Technical Information Service), Report No.: NSF/RANN/SE/GI-37815/PR/73/4 (January 1974). The detailed description of a heat storage vessel is given in pages 138 to 143, and page 202. According to the system given in FIG. 13, 2-3, there is provided a heat storage vessel filled with water internally, i.e., a steam accumulator. Part of the steam produced by a solar collector is introduced to an accumulator for heating water therein. Heat is stored in the accumulator in the form of a saturated water and saturated steam, and then the saturated water is self-vaporized and then the saturated steam is supplied to a turbine.

However, this type of prior art system also suffers from another disadvantage in that since the accumulator is provided in the form of a pressure vessel of a large mass, thermal storage under a high pressure is impossible. In this respect, the pressure in the accumulator should be limited to 70 atg which is customary for a nuclear power pressure vessel, according to the state of the art. The maximum temperature of steam in this case is 280° C., and the steam temperature on this order can hardly bring about a high efficiency for a turbine plant. Furthermore, the production of steam lowers a pressure in the accumulator, and hence the temperature of steam to be supplied to a turbine is lowered, as the time goes on, so that energy collected at a high temperature can not be effectively used without a temperature loss.

Another example of a prior art system is given in pages 166 to 173; "Dynamix Conversion of Solar Generated Heat to Electricity "NASA CR134724" (August 1974) by J. C. Powell, et al.

A third prior art system is given on line 22, pages 138 to line 6, page 139, "Solar Thermal Electric Power System", which has been cited earlier. This system includes a heat storage vessel filled with a thermal storage material for effecting the phase change between solid and liquid. A heat storage vessel filled with a thermal storage material (for instance molten salt) effecting the aforesaid phase change of solid-liquid is connected to a pipe route between a collector field and a turbine. Two or more heating pipes, through which steam flows from the collector field, are placed in the heat storage vessel, with thermal storage material encompassing the same.

As compared with the other described prior art systems, this prior art system permits the maintenance of a steam temperature for a turbine at a high level, but suffers from a drawback in that heat is stored in the form of a superheated steam, and thus a long period of time is required for storing heat. For instance, in case the temperature of superheated steam is dropped by 50° C. (temperature of steam to be supplied to a turbine is 400° C.) for thermal storage, then an enthalpy head of steam will be about 25 kcal/kg. On the other hand, when the duration of sunshine is shortened, as a result, a solar collector can no longer be used, the enthalpy of about 650 kcal/kg is required for obtaining superheated steam on the order of 400° C. in a water feeding condition (in the case of the use of a deaerator, about 140° C. steam) from a heat storage vessel. In case steam provides the same flow rate upon heat storage and heat radiation, the time required for thermal storage amounts to about 26 times as long as the time required for heat radiation.

SUMMARY OF THE INVENTION

It is an object of the present invention to provide a solar thermal electric power system which enables economical generation of an electric power.

It is another object of the present invention to provide a solar thermal electric power system which provides a short thermal storage time.

It is still another object of the present invention to provide a solar thermal electric power system which prevents thermal shock in a turbine.

According to the present invention, there is provided a solar thermal electric power system, in which a solar collector, a first heat storage vessel means filled with a first thermal storage material for effecting a phase change between solid and liquid, a turbine, and condensing means are connected in this order to form a closed loop. A first valve means is provided on a pipe route between the solar collector and the first thermal storage means. A second thermal storage means filled with a second thermal storage material for effecting the phase change between a liquid and a gas is connected to a pipe route between the solar collector and the first valve means via second valve means as well as to a pipe route between the first valve means and the first thermal storage means via a third valve means. There is further provided means for detecting the temperature of a fluid flowing out of the solar collector and control means responsive to a measured temperature of the temperature detecting means below a predetermined temperature for closing the first valve means and opening the second valve means.

DESCRIPTION OF THE PREFERRED EMBODIMENTS

Figure 1:
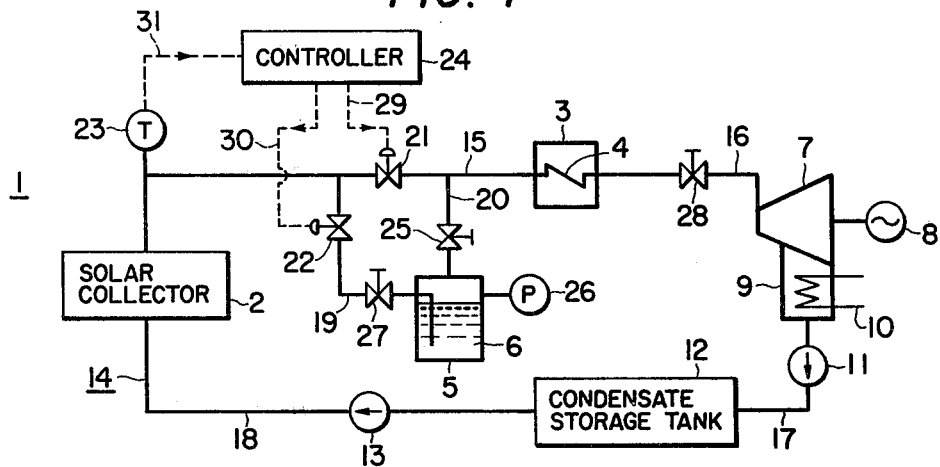
FIG. 1 is a schematic diagram of a solar thermal heat electric power system according to one embodiment of the present invention.

One embodiment of the present invention will now be described in more detail with reference to FIG. 1, hereunder. A solar thermal electric power system 1 includes a solar collector 2, a heat storage vessel 3, an steam accumulator 5, a turbine 7, a steam condenser 9, a feed water pump 13 and the like. A heating pipe 4 is provided internally of the heat storage vessel 3. The solar collector 2 is connected to the heating pipe 4 by a piping 15. Molten salt serving as a thermal storage material is filled around the heating pipes 4 within the heat storage vessel 3. Included by the thermal storage material as used herein are those given in Table 1. A pipe 15 is connected to a control valve 21. The heating pipe 4 in the heat storage vessel 3 is connected to a turbine by a pipe 16.

TABLE 1

| Thermal Storage Material | Melting point | Collected heat temperature |
|---|---|---|
| RF(50 mol %)-LiF(50 mol %) | 492° C. | 550°–600° C. |
| KF(42 mol %)-LiF(46.5 mol %)-NaF(11.5 mol %) | 454° C. | 500°–550° C. |
| MgCl$_2$(60 mol %)-FCl(20 mol %)-NaCl(20 mol %) | 396° C. | 450°–550° C. |

A valve 28 is provided in pipe 16. A generator 8 is coupled to a rotary shaft of a turbine. The steam condenser 9 is provided in a lower portion of the turbine 7. A cooling pipe, through which cooling water flows internally, is provided within the steam condensate. The steam condenser 9 and a condenser storage tank 12 are connected via a condensate pump 11 by a pipe 17. Provided in a pipe interconnecting the condensate storage tank and the solar collector 2 is a feed water pump 13. The solar collector 2, pipe 15, heating pipe 4, pipe 16, turbine steam condenser, pipe 17, condensate storage tank 12 and a pipe 18 form a closed loop 14.

Water 6 serving as a thermal storage material is filled internally of the steam accumulator 5. A pipe 19 has one end inserted into the water 6, and the other end thereof connected to the pipe 15 upstream of the control valve 21. A control valve 22 and a valve 27 are provided in the pipe 19. A pipe 20 having a control valve thereon interconnects the steam accumulator 5 and the pipe 15 downstream of the control valve 21. A temperature detector 23 is provided in the pipe 15 between a junction of the pipe 15 to the pipe 19, and the solar collector 2. A circuit 31 interconnects the temperature detector 23 and a controller 24. A circuit 29 is connected at its one end to the controller 24, and at the other to the control valve 21. A circuit 30 is connected at its one end to the controller 24, and at the other end thereof to the control valve 22. A pressure detector 26 is connected to the steam accumulator 5.

When the sun rises, the feed water pump 13 is driven and then water serving as a thermal medium within the condensate storage tank 12 is fed via pipe 18 to the solar collector 2. The solar collector 2 heats water to be supplied into the solar collector 2 by absorbing heat from the sun. At the time when the duration of sunshine is short, the temperature of a thermal medium at an outlet of the solar collector 2 is relatively low, so that the thermal medium in the form of water or the thermal medium of two phases of water and steam is discharged from the solar collector 2. The temperature detector 23 measures a temperature of a thermal medium discharged from the solar collector 2. A value of the temperature thus measured is delivered to the controller 24. In case the temperature of a thermal medium is lower than a predetermined temperature (for instance 450° C.), then the controller 24 closes the control valve 21 and opens the control valve 22. On the other hand, in case a temperature of thermal medium is higher than a predetermined temperature, then the controller 24 opens the control valve 21 and closes the control valve 22.

At the time when the duration of sunshine is short, the temperature of thermal medium discharged from the solar collector 2 is lower than a predetermined temperature of 450° C., so that the control valve 21 is closed and the control valve 22 is opened. The valve 27 is also opened. Accordingly, the thermal medium discharged from the solar collector 2 is supplied via pipe 19 to the accumulator 5. Water in the steam accumulator 5 is heated by a thermal medium at a high temperature. As the duration of sunshine is increased or extended, the thermal medium discharged from the solar collector 2 is turned into the form of steam. When water in the steam accumulator 5 is heated, then steam is produced, and hence a pressure in the steam accumulator is gradually increased. A pressure in the steam accumulator 5 is detected by a pressure detector 26. In case a pressure in the steam accumulator 5 exceeds a predetermined pressure level (for instance 70 atg.), then the control valve 25 is opened according to an instruction given by an operator. Steam at a saturation temperature of 280° C. is discharged from the steam accumulator 5. The steam thus discharged is delivered to the heating pipe 4 in the heat storage vessel 3 via pipes 20 and 15. Saturated steam supplied to heating pipe 4 is turned into superheated steam at a high temperature (400° C.) due to heat stored in a molten salt (for instance $MgCl_2$ (60 mol %)—KCl (20 mol %)—(NaCl (20 mol %)) within the heat storage vessel 3 in the preceding day, and then the superheated steam thus produced is delivered to the turbine 7 via pipe 16. This steam drives the turbine 7 and is then condensed in the steam condenser 9 into water. When the turbine 7 is driven, then the generator 8 starts rotation, thus generating electric power. Water which has been produced in the steam condenser 9 due to the operation of the condensate pump 11 is fed via pipe 17 to the condensate storage tank 12.

When time has lapsed, the duration of sunshine is increased, and the temperature of steam being discharged from the solar collector 2 exceeds 450° C., then the controller 24 is actuated, and thus the control valve 21 is opened and the control valve 22 is closed. Steam is supplied via pipe 15 to the heating pipe 4. Part of the heat contained in the superheated steam is absorbed into the molten salt within the heat storage vessel 3. The molten salt is changed from a solid state into a liquid state by being heated. In this manner, heat is stored in the heat storage vessel 3. A temperature of superheated steam discharged from the heat storage vessel 3 is lowered to a temperature (about 400° C.) close to a melting point of the molten salt. The superheated steam discharged from the heat storage vessel 3 is delivered to the turbine 7. When the control valve 22 is closed and a pressure in the accumulator 5 reaches 70 atg., then the control valve 25 is closed. In case of a sharp decrease in the amount of sunshine during the day time, and the temperature of steam detected by the temperature detector 23 is lowered below 450° C., then the control valve 21 is closed and the control valve 22 is opened. Steam discharged from the solar collector 2 is supplied to the steam accumulator 5. When a pressure within the steam accumulator 5 exceeds 70 atg., the control valve 25 is opened. Thereafter, when the amount of sunshine is increased, and the temperature of steam discharged from the solar collector 2 exceeds 450° C., then the control valve 22 is closed and the control valve 21 is opened.

In case the duration of sunshine is short, as on a rainy day, the control valve 25 is opened and the valve 27 is closed. The measurement of the temperature detector 23 is lower than 450° C., so that the control valve 21 is closed, and the control valve 22 is opened. The feed water pump 13 is stopped. When a pressure in the steam accumulator 5 remains at 7 atg., and a temperature becomes 280° C., then saturated steam is discharged from the steam accumulator 5. The steam thus discharged is delivered via pipes 20 and 15 to the heating pipe 4, and turned into superheated steam which in turn is discharged from the heat storage vessel 3. The superheated steam drives the turbine 7 and is then condensed into water in the steam condenser 9. The water thus condensed is stored in the condensate storage tank 12. A pressure in the steam accumulator 5 is lowered as the steam is discharged, and the temperature of steam is also lowered. However, the steam discharged from the steam accumulator 5 is heated by being passed through the heat storage vessel 3 into superheated steam at a temperature of 400° C. When the electric power generation is completed by using steam discharged from the steam accumulator 5, then water in the condensate storage tank 12 is returned to the steam accumulator 5, until a water level in the steam accumulator 5 reaches a given level. The water level adjustment may be accomplished by opening the valve 27 and driving the feed water pump 13 or otherwise by connecting the condensate storage tank 12 to the steam accumulator 5, and providing a pipe having a pump.

Figure 2:
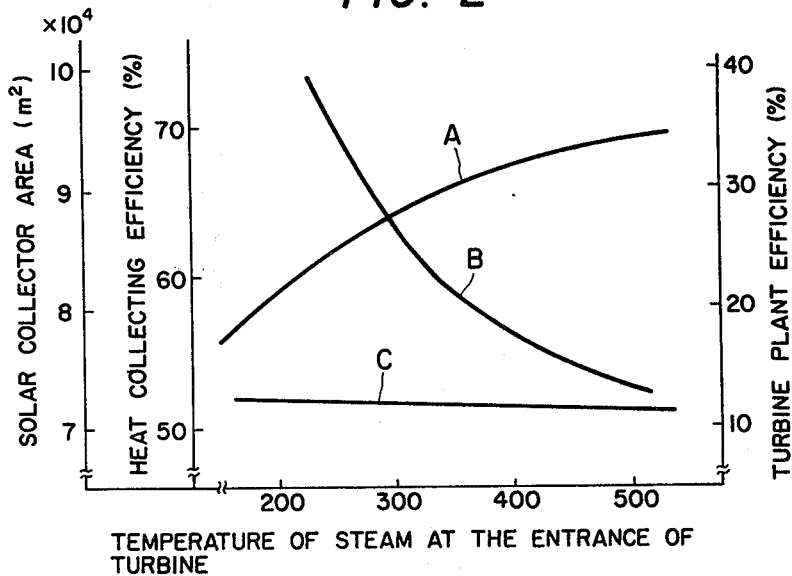
FIG. 2 is a graphical presentation of characteristics representing the relationship between the temperature of steam at the entrance of a turbine versus a solar collector area, heat collecting efficiency, and turbine plant efficiency.

With the apparatus given as the first embodiment of the invention which is shown in FIG. 1, superheated steam at a high temperature may be supplied to the turbine all the time, thereby maintaining a high turbine plant efficiency. FIG. 2 represents the results of tests given to the first embodiment. FIG. 2 shows the characteristic of the solar thermal electric power system 1 of an electric output of 10,000 KW. A curve A denotes a turbine plant efficiency, a curve B a solar collector area, and a curve C a heat collecting efficiency. With the solar thermal electric power system of the second prior art type, as has been described earlier, in case heat is stored under a pressure of 70 atg., then a maximum temperature of steam produced is 280° C., and a turbine plant efficiency is 27 to 28% at the highest at an output of 10,000 KW. In contrast thereto, according to the embodiment of FIG. 1, even if the pressure in an steam accumulator is low, the steam whose heat is collected in the heat storage vessel 3 may be supplied to a turbine. In other words, the temperature of steam to be supplied to a turbine may be raised to above 400° C., achieving a turbine plant efficiency of over 32%. More particularly, in terms of a solar collector area of a solar collector for obtaining a given electric power (for instance 10,000 KW), when the system according to the present invention is compared with the prior art system, then the solar collector area in the second prior art system is almost 90,000 $m^2$, while in the system of the embodiment of FIG. 1, the solar collector area remains to be only 75,000 $m^2$ at a temperature of 450° C. Stated differently, the solar collector area may be reduced by over 15%. In the solar thermal electric power system, the cost of the entire solar collectors occupies 60 to 70% of the cost of the whole plant. In this respect, the reduction of the solar collector area greatly contributes to the reduction in a construction cost of a plant.

Comparison is made to the first prior art system with the embodiment of FIG. 1 according to the present invention. The former adopts a heat exchange type, so that a difference between the collection temperature and the temperature at the inlet of a turbine will be about 200° C., and even if heat is collected at 500° C., the temperature at the inlet of a turbine reaches about 300° C., thus providing a difference in solar collector area. Furthermore, according to the embodiment of the invention, steam passes through the heat storage vessel, so that even if the temperature at the inlet of a heat storage vessel is varied, a variation of temperature at the outlet of a heat storage vessel is suppressed due to the exchange of heat between the steam and the thermal storage material in the heat storage vessel. Furthermore, according to the former system, the temperature at the inlet of a turbine is lowered due to a lowered collection temperature which is caused by a decrease in the duration of sunshine, and according to the system of the embodiment, heat may be stored in the high and low stages. As a result, even if the heat is collected at a low temperature, the steam at a high temperature may be supplied to a turbine by means of the heat storage vessel which stores heat at a high temperature, thereby maintaining a high plant efficiency.

Still furthermore, according to the embodiment of FIG. 1, the time required for thermal storage may be shortened. In other words, in case the same condition as has been referred to in the third prior art system is followed, then thermal energy corresponding to an enthalpy drop of 25 Kcal per 1 kg may be stored from the steam upon thermal storage. On the other hand, upon radiation of heat, the thermal energy required for raising a temperature of steam from a temperature of saturated steam discharged from the steam accumulator 5, to a given temperature of the superheated steam should only be supplied from the heat storage vessel 3 to the steam. In this case, an enthalpy rise of steam is about 100 Kcal/kg at 400° C. Accordingly, in case the flow rates of steam both at the time of thermal storage and heat radiation are equal, then the heat charging time may be four times as long as the heat discharging time. The time required for charging heat according to the embodiment of FIG. 1 may be reduced to about 1/6 of that in the third prior art system. The shortening of the heat charging time may avoid the influence due to a change in the duration of sunshine, and hence a variation in temperature of superheated steam to be supplied to a turbine may be minimized. Furthermore, the volume of heat storage vessel 3 may be reduced. Stated differently, this means the extension of a heat discharging time. In other words, even if the duration of sunshine is short, superheated stream at a given temperature level may be supplied to the turbine.

With the embodiment of FIG. 1, the control valves 21 and 22 are opened and closed at a reference temperature of 450° C. However, this reference temperature may be any temperature as far as it is above 290° C. (In case a predetermined internal pressure in the steam accumulator is 70 atg., this temperature varies depending on a set internal pressure in the accumulator.) When the temperature of steam to be supplied to the heat storage vessel 3 is higher than the temperature of a thermal storage material in the heat storage vessel 3, heat is transferred from the steam to the thermal storage material, so the heat may be stored therein. Conversely, in case the temperature of steam is lower than the temperature of a thermal storage material, then the heat is transferred from the thermal storage material to steam.

Figure 3:
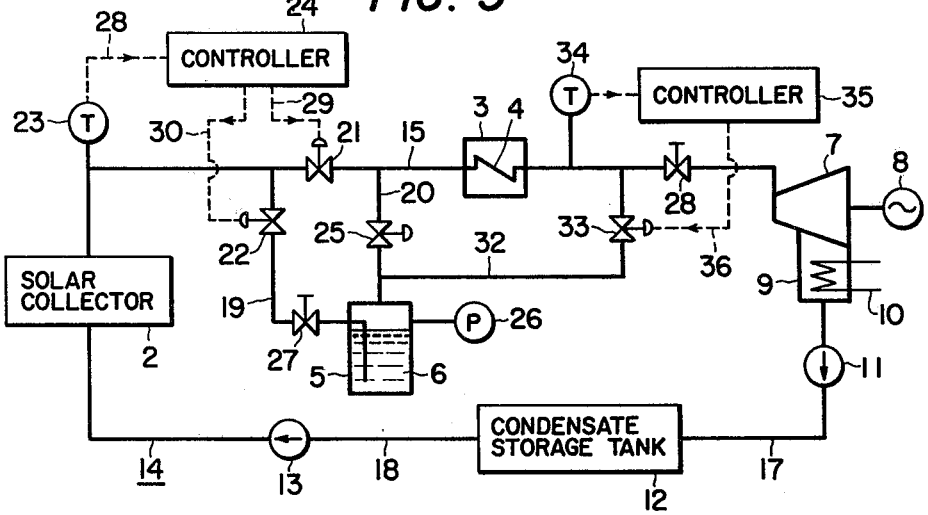
FIG. 3 is a schematic view of the solar thermal electric power system according to another embodiment of the invention.

FIG. 3 shows another embodiment of the present invention. However, description will be limited to only differences between the two embodiments. The pipe 20 between the steam accumulator 5 and the control valve 25 is connected to the pipe 16 by a pipe 32. A control valve 33 is provided on the pipe 32. A temperature detector 34 is provided in a portion of the pipe 16 upstream of a junction of the pipe 16 to the pipe 32. The temperature detector 34 is connected via controller 35 to the control valve 33 by means of a circuit 36.

When heat is sufficiently stored in the heat storage vessel 3, then the temperature of steam discharged from the heat storage vessel 3 is increased, as compared with a given temperature of steam to be supplied to the turbine 7. Thus, the temperature of superheated steam discharged from the heat storage vessel 3 is measured by the temperature detector 34, and then the temperature of superheated steam to be supplied to the turbine 7 is adjusted, based on the measurement of the above temperature. A measurement derived from the temperature detector 34 is delivered to the controller 35. In case the above measurement exceeds a predetermined value (for instance 400° C.), then the control valve 33 is opened according to the operation of the controller 35. An opening of the control valve 33 is adjusted based on the aforesaid measurement. The saturated steam at 280° C., which is produced in the steam accumulator 5, is supplied through the pipe 32 to the pipe 16. Accordingly, the temperature of steam to be supplied to the turbine 7 is maintained at 400° C. The temperature of steam may be arbitarily determined according to the specification of a turbine and a load to be imposed thereon.

The same effect as that of the first embodiment of FIG. 1 may be achieved by the embodiment of FIG. 3. In this case, steam at a much higher temperature may be supplied to the turbine 7, thereby preventing thermal shock on a turbine.

What is claimed is:

1. A solar thermal electric power system having a closed loop thermal fluid circulation path including in seriatum a solar collector, a first thermal storage means which stores heat by converting a material therein from a solid to liquid phase, a turbine, and a condensing means, the improvement comprising:
   first valve means in said fluid circulation path between said solar collector and said first thermal storage means;
   a second thermal storage means connected to said fluid circulation path between said solar collector and said first valve means by a first pipe means and to said fluid circulation path between said first valve means and said first thermal storage means by a second pipe means;
   second valve means disposed in said first pipe means;
   third valve means in said second pipe means;
   temperature detecting means for measuring the temperature of said thermal fluid in said circulation path between said solar collector and said first valve means;
   control means for closing said first valve means and opening said second valve means in response to the measurement of a temperature below a predetermined level by said temperature detecting means.

2. A solar thermal electric power system as set forth in claim 1, wherein said first thermal storage material is a molten salt.

3. A solar thermal electric power system as set forth in claim 1, wherein said thermal fluid is water, and said second thermal storage means accumulates steam.

4. A solar thermal electric power system as set forth in claim 2, wherein said thermal fluid is water, and said second thermal storage means accumulates steam.

5. A solar thermal electric power system as set forth in claim 1, further comprising:

third pipe means connecting said second thermal storage means to said fluid circulation path between said first thermal storage means and said turbine;

fourth valve means in said third pipe means;

second temperature detecting means for measuring the temperature of said thermal fluid in said fluid circulation path between said first thermal storage means and said turbine; and second control means for opening said fourth valve means when said second temperature detecting means measures a temperature higher than a predetermined level.

6. A solar thermal electric power system as set forth in claim 5, wherein said first thermal storage material is a molten salt.

7. A solar thermal electric power system as set forth in claim 5, wherein said thermal fluid is water, and said second thermal storage means accumulates steam.

8. A solar thermal electric power system as set forth in claim 5, wherein said thermal fluid is water, and said second thermal storage means accumulates steam.

* * * * *